June 3, 1930.	E. L. DRONBERGER	1,760,899
COMBINED AWNING AND SHADE
Filed Nov. 6, 1926	2 Sheets-Sheet 2
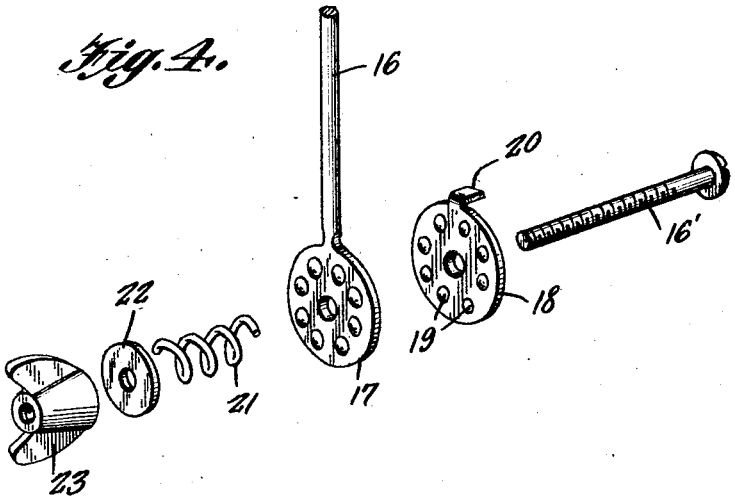
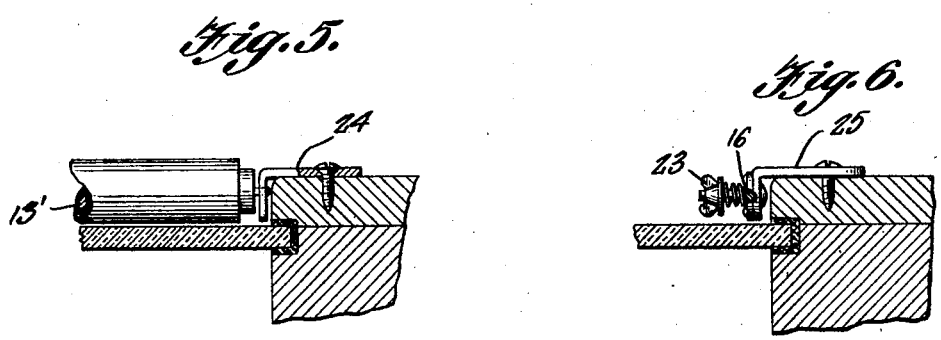

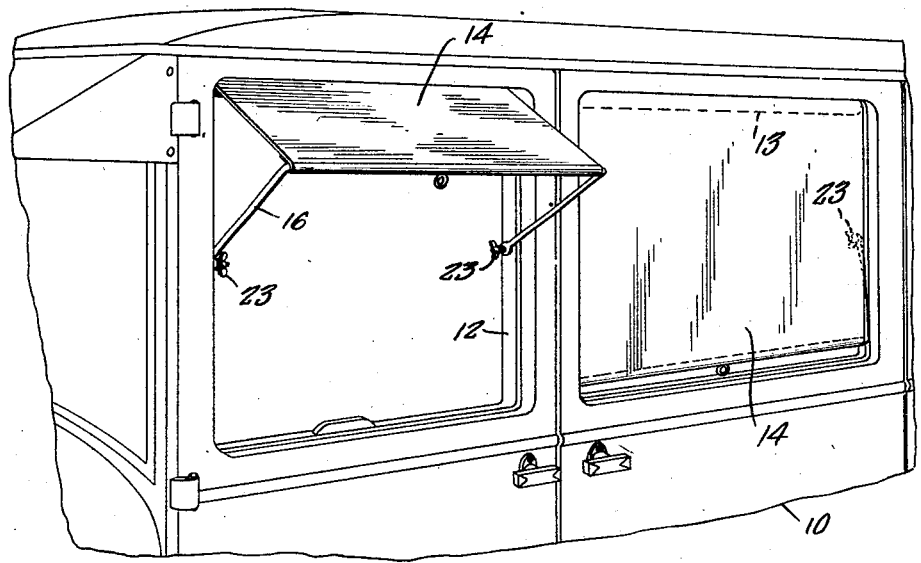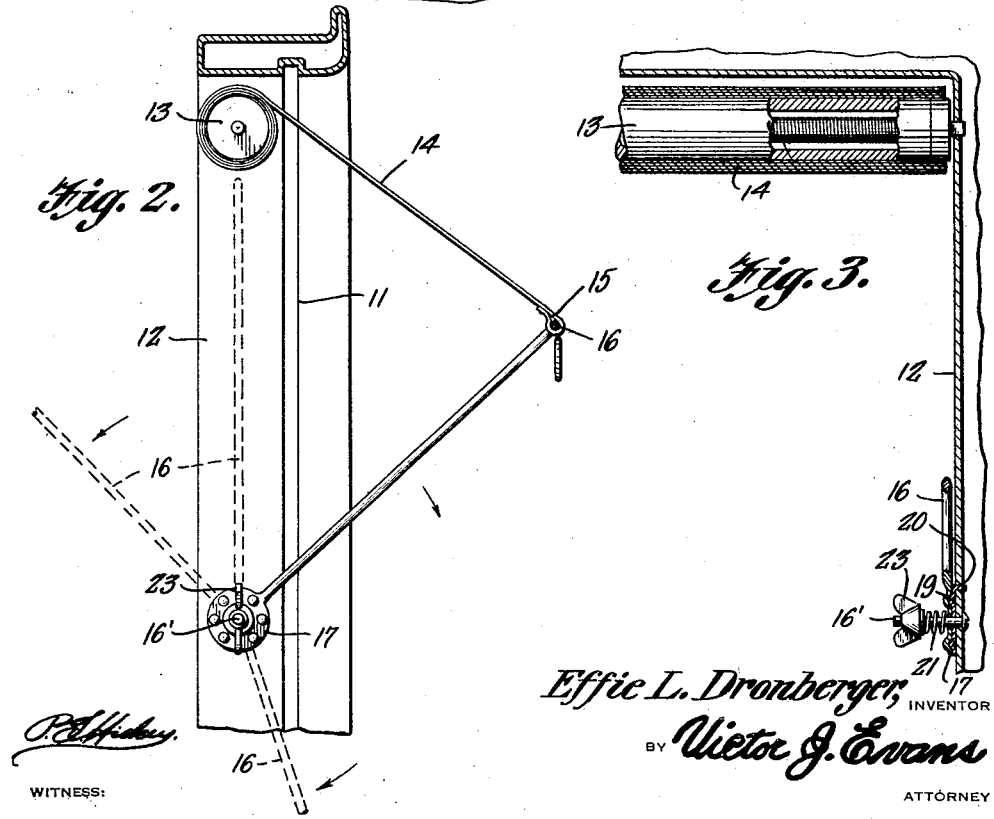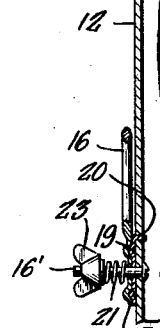

Patented June 3, 1930

1,760,899

UNITED STATES PATENT OFFICE

EFFIE L. DRONBERGER, OF THREE SANDS, OKLAHOMA

COMBINED AWNING AND SHADE

Application filed November 6, 1926. Serial No. 146,760.

This invention relates to combined awnings and shades for use upon motor vehicles behind the windows therefor and adapted to be swung to position upon the opposed sides of the windows to serve the intended purposes.

Another object of the invention comprehends an operating mechanism to swing the device in a desired position.

A further object of the invention contemplates a locking mechanism for sustaining the operating means in a desired position when the device is called into use.

More specifically stated the device is wound upon a roller member journaled within a window frame and from which the device is extended and retracted for active use.

With the above and other objects in view, the invention further consists of the following novel features and details of construction to be hereinafter more fully described, illustrated in the accompanying drawings and pointed out in the appended claim.

In the drawings:

Figure 1 is a fragmentary perspective of a motor vehicle illustrating the application of the invention thereon.

Figure 2 is a vertical sectional view taken through a motor vehicle window frame and illustrating, by the several dotted lines, the various positions at which the device may be positioned when called into active use.

Figure 3 is a sectional view taken through the roller member and a portion of the operating and locking means.

Figure 4 is a perspective of the locking and operating mechanism.

Figures 5 and 6 are detailed views of a modified form of the invention utilizing bracket plates when the device is applied upon motor vehicle windows devoid of moulding strips.

Referring to the drawings in detail, wherein like characters of reference denote corresponding parts, the reference character 10 indicates a portion of a motor vehicle preferably a closed model having plate glass panels slidably mounted within resilient guide grooves 11 provided in the side and top rails of a window frame therefor. The particular vehicle is provided with moulding strips 12 disposed within the frame and rearwardly of the grooves 11; all of the above is of the usual and well known construction peculiar to that of motor vehicles and which forms no part of the present application for Letters Patent but which is merely mentioned for purposes of illustration in bringing forward the novel advantages of the above entitled invention.

The invention contemplates a roller member 13 having trunnions carried at the respective ends thereof positioned within openings provided upon the inner sides of the side moulding strips from which position said roller may be conveniently manipulated. A length of material such as indicated at 14 embodying the characteristics and propensities substantially that of the constituents of awning material is wound upon said roller 13. The outer edge of said strip forms a pocket 15. A substantially inverted U-shaped operating member 16 has the yoke portion thereof received within the pocket 15. The extremities of the arms formed by said member 16 terminate to provide indented disks 17.

In the application of the invention upon the particular type of vehicle the side rails of the window frame are removed to permit the insertion of bolt members 16' therethrough from the inner sides thereof and to position the heads therefor against the inner sides thereof. The outer threaded ends thereof are inwardly disposed from the side rails of the window frame and passed centrally of the disks 17 subsequent to that of companion disk members 18 providing embossed portions 19 adapted for reception within the indentations of the disks 17. Off-set ears 20 are carried upon the peripheries of the disks 18 and adapted for reception within cutout portions provided in the outer surfaces of the moulding strips to prevent accidental circumferential movement. Compression springs 21, washers 22 and wing nuts 23 are received upon the outer ends of the bolts 16' and adapted to force the indented disks 17 outwardly through the tension of the springs 21 in order that the embossed portions 19 of the disks 18 will be properly engaged and received within the indentations of the disks 17. Such arrangement will permit the operating arm 16 to be swung and locked in any of the positions as illustrated in Figure 2 of the drawings.

As illustrated, the operating arm may be swung outwardly or inwardly of the window frame and to be utilized either as an awning or a curtain when swung to the respective positions substantially as illustrated in Figure 1 of the drawings. Due to the fact that the invention is mounted upon the inner sides of the grooves 11, the glass panels, not shown, for the window, when raised, will prevent the device from being tampered with by unauthorized persons.

In Figures 5 and 6 of the drawings, I have illustrated a modified form of the invention primarily adapted for use upon vehicles not having removable rail sections.

In order to provide means for the application of the invention upon such frames I employ angle plates 24 which are adapted to lie flush with the inner sides of the window frames and have the offset portions thereof disposed outwardly within the opening in the frame and adjacent the glass panel. The trunnions for a roller 13' are carried within the openings provided in such offset end portions.

Likewise the identical form of operating mechanism is utilized in conjunction with the modified form of the invention and upon an angle plate 25 disposed in a like manner to that of the plates 24. The companion disks 18, as used in the preferred form of the invention, are of no effect in the application of the modified form of the invention and hence the functional duties of such disks are embodied in the inwardly offset end portions of the plates 25. It will thus be noted in the foregoing description and accompanying drawings that the invention may be equally and effectually as well applied upon vehicles constructed with or without window frame sections.

The pawl and ratchet connections, as provided for the flattened forms or types of trunnions in the conventional forms of shade rollers, are omitted in the present invention although the identical form of roller is employed whereby the spring in the roller per se, after the roller is set in the window opening in the door of the car, will exercise a constant tension upon the awning rolled thereon inasmuch as the member 16 is held stationary incident to the connection established between the disk members 17 and 18 respectively.

The invention is susceptible of various changes in its form, proportions and minor details of construction, and the right is herein reserved to make such changes as properly fall within the scope of the appended claim.

Having thus described my invention what is claimed is:

A combination awning and shade bracket for use upon motor vehicles comprising a substantially inverted U-shaped member, indented disks carried upon the opposite ends of the member, disks having embossed portions arranged in circuitous courses thereon and adapted for reception within the indentations of the first mentioned disks, ears offset at right-angles from the peripheries of the embossed disks being adapted for reception within portions removed in the window openings, pivot bolts carried by the window construction passed centrally through the associated disks, springs carried upon the pivot bolts for the U-shaped member and abutting the adjacent faces of the first mentioned disks, and means carried upon the pivot bolts to regulate tension of the springs against the disks.

In testimony whereof I affix my signature.

EFFIE L. DRONBERGER.